(12) United States Patent
Kikuchi et al.

(10) Patent No.: US 12,502,939 B2
(45) Date of Patent: Dec. 23, 2025

(54) ROOF MODULE FOR VEHICLE

(71) Applicant: YACHIYO INDUSTRY CO., LTD., Sakura (JP)

(72) Inventors: Moto Kikuchi, Sakura (JP); Hirotaka Kamioka, Sakura (JP)

(73) Assignee: YACHIYO INDUSTRY CO., LTD., Sakura (JP)

( * ) Notice: Subject to any disclaimer, the term of this patent is extended or adjusted under 35 U.S.C. 154(b) by 0 days.

(21) Appl. No.: 18/852,110

(22) PCT Filed: Jan. 31, 2023

(86) PCT No.: PCT/JP2023/003043
§ 371 (c)(1),
(2) Date: Sep. 27, 2024

(87) PCT Pub. No.: WO2023/188783
PCT Pub. Date: Oct. 5, 2023

(65) Prior Publication Data
US 2025/0206109 A1   Jun. 26, 2025

(30) Foreign Application Priority Data
Mar. 28, 2022   (JP) .................. 2022-051188

(51) Int. Cl.
*B60J 7/06*   (2006.01)
*E05F 15/00*   (2015.01)
(52) U.S. Cl.
CPC .............. *B60J 7/067* (2013.01); *E05F 15/00* (2013.01); *E05Y 2900/542* (2013.01)

(58) Field of Classification Search
None
See application file for complete search history.

(56) References Cited

U.S. PATENT DOCUMENTS 6,899,380 B2 * 5/2005 Kralik ................... B60J 7/0015
296/214
7,814,958 B2   10/2010 Hansen et al.
(Continued)

FOREIGN PATENT DOCUMENTS

CN   101186178 A   5/2008
CN   103009971 A   4/2013
(Continued)

OTHER PUBLICATIONS

International Search Report (with English translation) received in corresponding Application No. PCT/JP2023/003043, dated Apr. 18, 2023, 6 pages.
(Continued)

*Primary Examiner* — Joseph D. Pape
(74) *Attorney, Agent, or Firm* — Dority & Manning, P.A.

(57) ABSTRACT

A roof module includes: a roof panel; a pair of guide rails mounted on an inner surface of the roof panel and extending in a front-rear direction of the vehicle; a shade sheet guided by the guide rails; a winding device supported by the guide rails and configured to wind up the shade sheet and a drive source configured to drive the shade sheet in an unwinding direction and a winding direction. The winding device and the drive source are arranged in a concentrated manner on a rear end side of the guide rails, and no cross member connecting the guide rails is provided on a front end side of the guide rails.

3 Claims, 6 Drawing Sheets

(56) References Cited

U.S. PATENT DOCUMENTS

| | | | |
|---|---|---|---|
| 8,567,858 B2 | 10/2013 | Kitani et al. | |
| 8,770,258 B2 * | 7/2014 | Kitani | B60J 7/0015 |
| | | | 160/265 |
| 8,777,302 B2 | 7/2014 | Kanai et al. | |
| 8,777,303 B2 | 7/2014 | Annawald et al. | |
| 8,881,789 B2 * | 11/2014 | Zeo | B60J 7/0015 |
| | | | 296/214 |
| 8,936,304 B2 | 1/2015 | Lin et al. | |
| 8,955,575 B2 * | 2/2015 | Glasl | B60J 7/0015 |
| | | | 160/370.22 |
| 9,227,486 B2 * | 1/2016 | Dietl | B60J 7/0015 |
| 9,616,735 B2 | 4/2017 | Takakura et al. | |
| 10,155,434 B2 * | 12/2018 | Hoelzel | B60J 1/2025 |
| 10,173,503 B2 * | 1/2019 | Ten-Jet-Foei | B60J 1/2075 |
| 10,960,742 B2 | 3/2021 | Hiramatsu | |

FOREIGN PATENT DOCUMENTS

| | | |
|---|---|---|
| CN | 105142944 A | 12/2015 |
| CN | 206314843 U | 7/2017 |
| CN | 213799190 U | 7/2021 |
| CN | 215292300 U | 12/2021 |
| JP | S 63258213 A | 10/1988 |
| JP | H 9226379 A | 9/1997 |
| JP | 2013193599 A | 9/2013 |
| JP | 3189648 U | 3/2014 |
| JP | 2015174485 A | 10/2015 |
| JP | 2017007625 A | 1/2017 |
| JP | 2018043631 A | 3/2018 |
| JP | 2019177707 A | 10/2019 |
| WO | WO 2012/043412 A1 | 4/2012 |
| WO | WO 2017/122487 A1 | 7/2017 |

OTHER PUBLICATIONS

Written Opinion (w/ English translation) in corresponding PCT Application No. PCT/JP2023/003043, mailed Apr. 18, 2023, in 6 pgs.

Chinese Office Action (w/English translation) for corresponding Application No. 202380023659.6, dated Jul. 9, 2025, 11 pages.

Chinese Office Action for Corresponding Application No. 202380023659.6, dated Dec. 27, 2024, 7 pages.

\* cited by examiner

ROOF MODULE FOR VEHICLE

CROSS-REFERENCE TO RELATED APPLICATIONS

This application is the U.S. National Stage entry of International Application No. PCT/JP2023/003043, filed on Jan. 31, 2023, which, in turn, claims priority to Japanese Patent Application No. 2022-051188, filed on Mar. 28, 2022, both of which are hereby incorporated herein by reference in their entireties for all purposes.

TECHNICAL FIELD

The present invention relates to a roof module for a vehicle.

BACKGROUND ART

Conventionally, as a roof module for a vehicle, there is known a roof module having a sunshade guide rail fixed to an automobile headliner. The sunshade guide rail is composed of side rails fixed to left and right side portions of a sunroof opening, a front rail joined to front portions of the left and right side rails to be fixed to the front end of the sunroof opening, and a crossing rail made of synthetic resin and joined to front-rear intermediate portions of the left and right side rails to be fixed to the rear end of the sunroof opening.

PRIOR ART DOCUMENT(S)

Patent Document(s)

Patent Document 1: JPH9-226379A

SUMMARY OF THE INVENTION

Task to be Accomplished by the Invention

Incidentally, the roof of the automobile is provided with many functional components, such as interior lights, operation switches therefor, operation switches for the sunshade, etc., disposed above the driver's seat, namely, on a front portion of the roof. However, in the conventional technology mentioned above, the front rail is disposed in a front portion of the automobile headliner. This limits the arrangement space for the functional components, and the functional components cannot be arranged on the front portion of the roof in a free layout.

In view of the foregoing background, an object of the present invention is to provide a roof module for a vehicle which can improve the degree of freedom of layout in a front portion of the roof.

Means to Accomplish the Task

To achieve the above object, one aspect of the present invention provides a roof module (1) for a vehicle, the roof module comprising: a roof panel (2); a pair of guide rails (6) mounted on an inner surface of the roof panel and extending in a front-rear direction of the vehicle: a shade sheet (8) guided by the guide rails; a winding device (9) supported by the guide rails and configured to wind up the shade sheet: and a drive source (12) configured to drive the shade sheet in an unwinding direction and a winding direction, wherein the winding device and the drive source are arranged in a concentrated manner on a rear end side of the guide rails, and no cross member connecting the guide rails is provided on a front end side of the guide rails.

According to this aspect, since the winding device, the drive source, and the cross member are not provided on the front end side of the guide rails, the degree of freedom of layout in the front portion of the roof is improved.

In the above aspect, preferably, the roof module further comprises a rear cross member (7) connecting rear portions of the guide rails to each other.

According to this aspect, before being mounted to the roof panel, the pair of guide rails can be treated as a rail assembly in which the guide rails are connected by the rear cross member, and thus, the manufacture of the roof module is easy.

In the above aspect, preferably, the rear cross member is disposed in front of the winding device, and the shade sheet is guided by the rear cross member.

According to this aspect, the rear cross member functions as a guide member for the shade sheet. Therefore, there is no need to provide an additional member to guide the shade sheet, and the number of components can be reduced.

In the above aspect, preferably, the roof module further comprises a pair of guide pipes (15) configured to guide power transmission members (14) for transmitting a driving force of the drive source to the shade sheet, wherein the drive source is disposed behind the winding device and is connected to the guide rails via the guide pipes.

According to this aspect, before being mounted to the roof panel, the dive source and the rail assembly can be treated as a shade assembly in which the drive source is connected to the rail assembly via the guide pipes, and thus, the manufacture of the roof module is easy.

In the above aspect, preferably, a stopper (21) for restricting a movement of the shade sheet in the unwinding direction is integrally formed on each guide rail.

According to this aspect, there is no need to attach the stopper member to each guide rail as a separate member, and thus, the number of components can be reduced.

In the above aspect, preferably, the roof module further comprises a cross bar (10) provided at a front end of the shade sheet and including a pair of sliders (11) guided by the guide rails, the guide rails have guide walls (19) defining slider guide grooves (16) for guiding the sliders, and the stopper is formed of a part of each guide wall that is separated from another part by a notch (22) and is bent so as to protrude into the slider guide groove.

According to this aspect, the stopper can be formed easily by bending, toward the slider guide groove, the part separated by forming notches in each guide wall.

Effect of the Invention

According to the above aspect, it is possible to provide a roof module for a vehicle which can improve the degree of freedom of layout in a front portion of the roof.

MODE(S) FOR CARRYING OUT THE INVENTION

In the following, an embodiment of the present invention will be described in detail with reference to the drawings.

Figure 1:
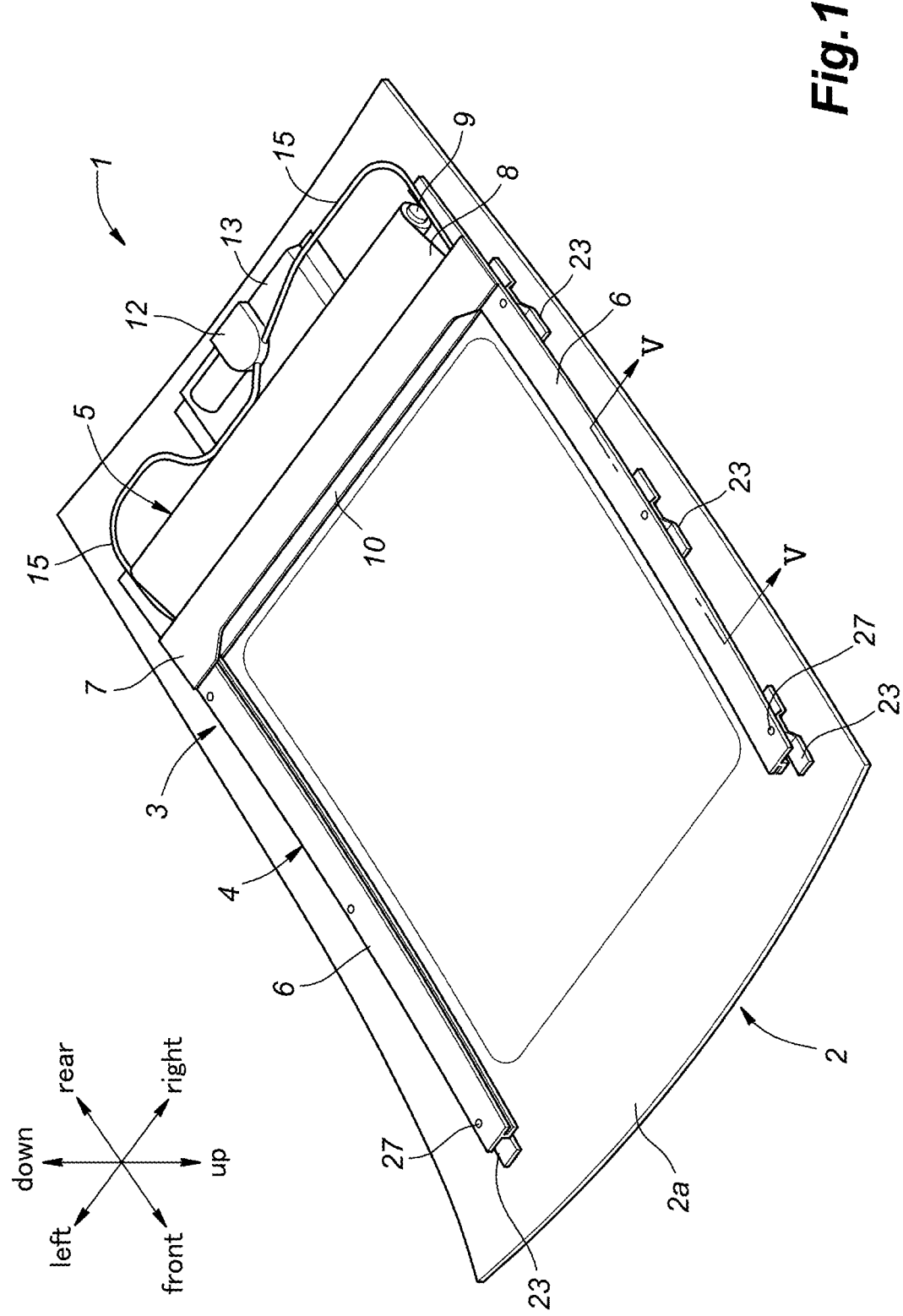
FIG. 1 is a perspective view showing a roof module according to an embodiment as seen from the interior side.

FIG. 1 is a perspective view showing a roof module 1 according to the embodiment as seen from the interior side. As shown in FIG. 1, the roof module 1 is configured to be disposed on an inner panel or side rails of a roof of a vehicle having an opening and supported by the inner panel or the side rails so that the roof module 1 functions as an outer panel forming an outer surface of the roof. The roof module 1 is provided with a roof panel 2 and a shade device 3 mounted on an inner surface (lower surface) of the roof panel 2.

The roof panel 2 is an outer panel forming the outer surface of the roof and is made of transparent or translucent glass or resin. The roof panel 2 has a shape curved in the left-right direction and the front-rear direction so as to be convex upward and is provided in a front portion of the roof. Accordingly, the front edge of the roof panel 2 is connected to the rear edge of the windshield via a seal member. From a rear part of the roof panel 2, an outer panel made of metal may continue or a rear window may continue.

The shade device 3 is a device for selectively blocking light passing the roof panel 2 into the vehicle cabin, and is disposed between the roof panel 2 and the inner panel or the side rails. Preferably, the inner surface of an outer peripheral portion of the roof panel 2 is coated with black ceramic 2*a* so that only the central part of the roof panel 2 is transparent or translucent.

The shade device 3 includes a rail assembly 4 mounted on the inner surface of the roof panel 2 and a roll shade 5 supported by the rail assembly 4. The rail assembly 4 is provided with a pair of guide rails 6 mounted on the inner surface of the roof panel 2 and extending in the front-rear direction of the vehicle and a rear cross member 7 connecting rear portions of the two guide rails 6 to each other near the rear ends. Each guide rail 6 is an extrusion molded product made of aluminum alloy and is curved in the longitudinal direction so as to be convex upward in conformity with the shape of the roof panel 2. The guide rails 6 have bilaterally symmetrical shapes and are disposed on side portions of the roof panel 2 to be parallel to each other, with a predetermined spacing therebetween in the vehicle width direction. The rear cross member 7 is a press molded product made of a steel plate and is rigidly joined to rear portions of the two guide rails 6. Thereby, the rail assembly 4 has a U-shape (a channel shape or a rectangle with an open front side) in plan view.

Figure 2:
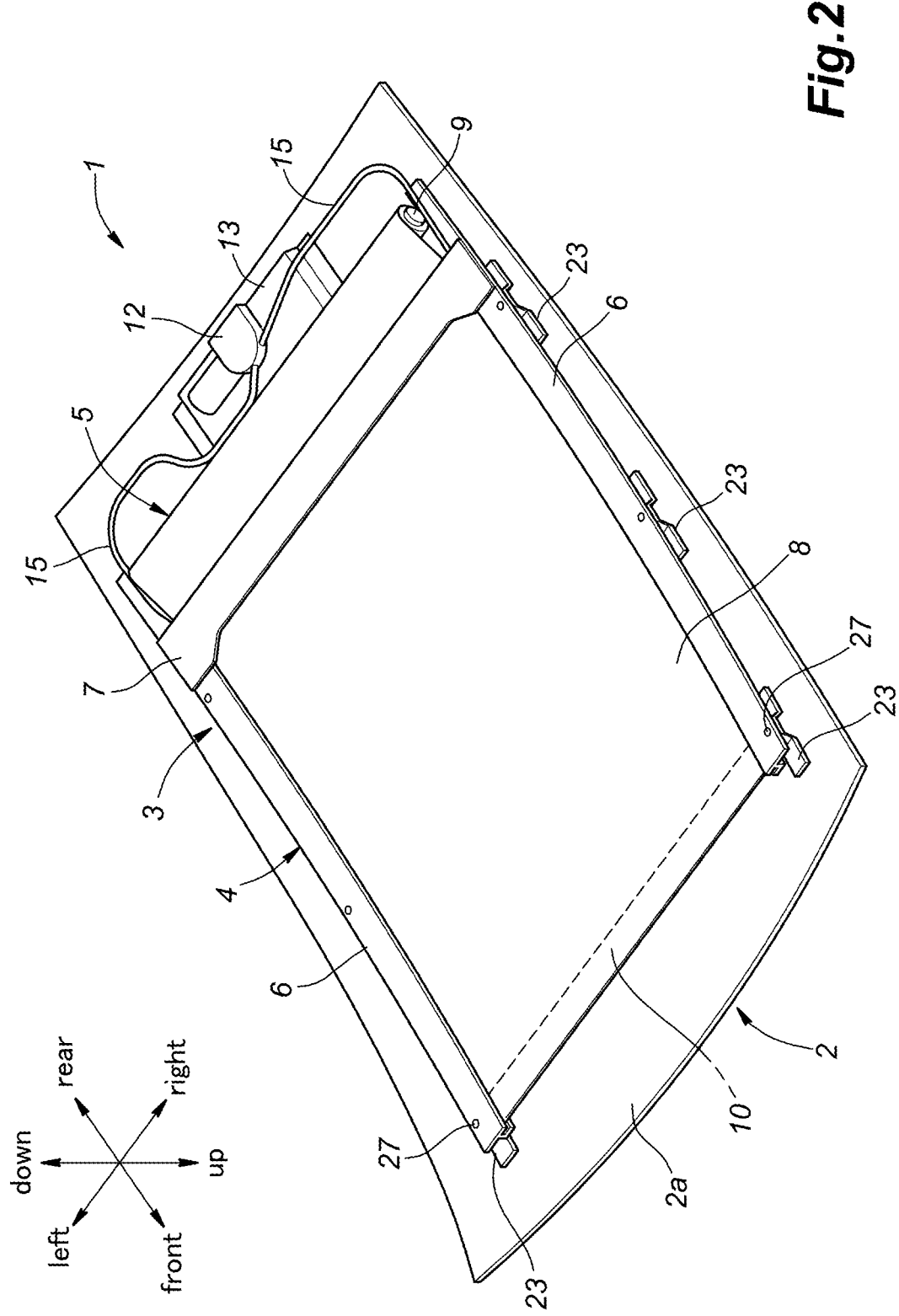
FIG. 2 is a perspective view of the roof module with a shade device in a closed state.

FIG. 1 is a perspective view showing the roof module 1 in an open state in which the roof panel 2 is not covered by the roll shade 5. On the other hand, FIG. 2 is a perspective view of the roof module 1 in a closed state in which the roof panel 2 is covered by the roll shade 5. As also shown in FIG. 2, the roll shade 5 is provided with a shade sheet 8 for blocking light passing through the roof panel 2 and a winding device 9 for winding up the shade sheet 8. The shade sheet 8 is guided by the guide rails 6 to be movable between a deployed position shown in FIG. 2 in which the shade sheet 8 is deployed inside the roof panel 2 and a stowed position shown in FIG. 1 in which the shade sheet 8 does not cover but opens the roof panel 2. The shade sheet 8 does not necessarily have to block light completely but may be configured to block at least part of light.

When in the stowed position, the shade sheet 8 is wound up by the winding device 9. The winding device 9 is disposed behind the rear cross member 7 and is supported at the rear ends of the guide rails 6. The winding device 9 is provided with a retraction spring (retractor spring) and always urges the shade sheet 8 in the winding direction toward the stowed position. Thereby, the shade sheet 8 is maintained taut in the front-rear direction. A cross bar 10 extending in the vehicle width direction is mounted at the front end of the shade sheet 8. Sliders 11 (see FIG. 3) supported by the respective guide rails 6 are integrally provided on both ends of the cross bar 10.

The rear cross member 7 is disposed in front of the winding device 9, and the cross bar 10 is disposed in front of the rear cross member 7. The shade sheet 8 extends from the winding device 9 to the cross bar 10 by passing above the rear cross member 7, and is always in contact with the upper surface of the rear cross member 7. Namely, the shade sheet 8 is guided by the rear cross member 7 and is held at the height of the upper surface of the rear cross member 7 at any pull-out position.

Behind the winding device 9, a drive source 12 for driving the shade sheet 8 in the unwinding direction and the winding direction is disposed. The drive source 12 is detachably mounted to a bracket 13 attached to the inner surface of the rear end portion of the roof panel 2 with bolts. The drive source 12 includes a motor and a speed reduction mechanism, and drives left and right power transmission members 14 (see FIG. 4), each consisting of a push-pull cable, by pushing and pulling them in a synchronized manner. The power transmission members 14 are connected to the sliders 11 at the front ends thereof, and convert the driving force into a force in the front-rear direction to transmit the force to the sliders 11. When the drive source 12 moves the cross bar 10 forward or rearward via the pair of power transmission members 14 and the pair of sliders 11, the shade sheet 8 is selectively driven in the unwinding direction or the winding direction.

The drive source 12 is disposed in a middle part of the roof panel 2 in the width direction. The power transmission members 14 are guided by a pair of guide pipes 15 between the drive source 12 and the respective guide rails 6. Namely, the drive source 12 is connected to the pair of guide rails 6 via the pair of guide pipes 15. Each power transmission member 14 is inserted into the guide rail 6 from the rear end of the guide rail 6 and extends forward to the slider 11 to which the front end thereof is connected.

Figure 3:
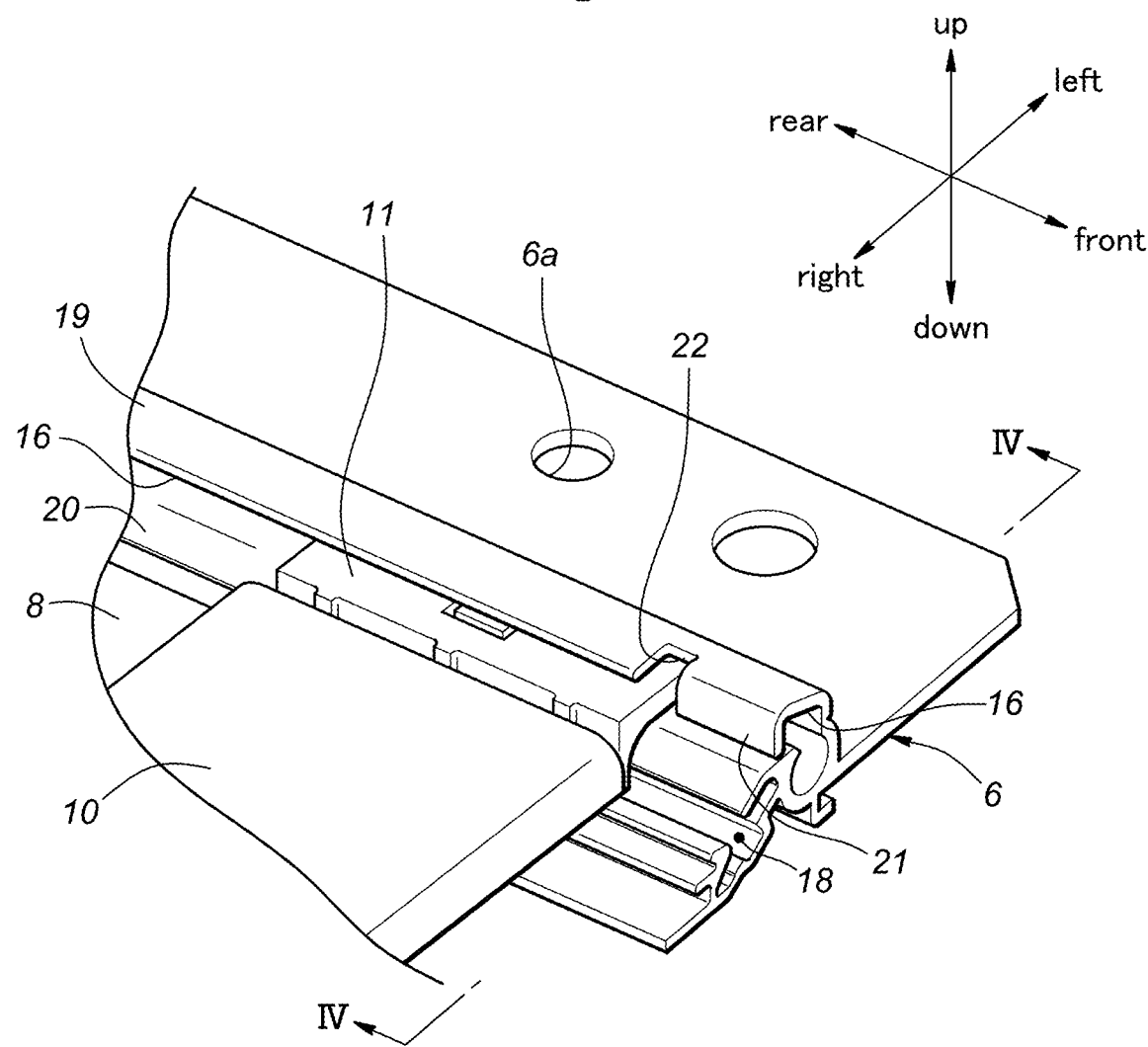
FIG. 3 is an enlarged perspective view of a front end portion of a guide rail as seen from the interior side.
Figure 4:
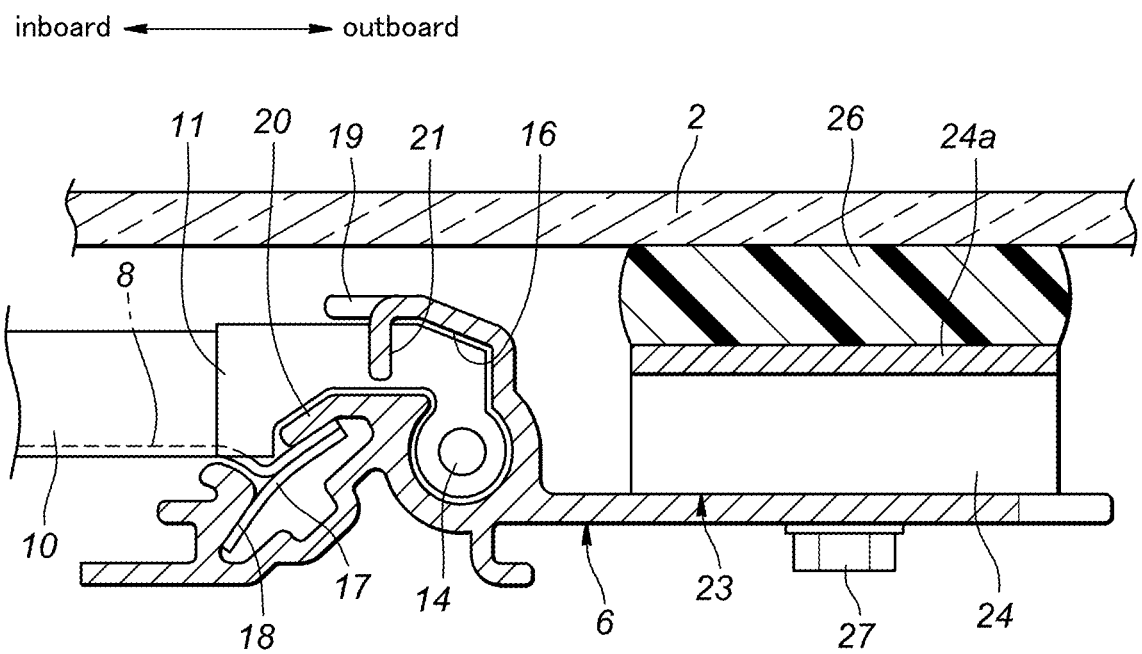
FIG. 4 is a sectional view taken along line IV-IV in FIG. 3.

FIG. 3 is an enlarged perspective view of a front end portion of the guide rail 6 as seen from the interior side, and FIG. 4 is a sectional view taken along line IV-IV in FIG. 3. As shown in FIGS. 3 and 4, the guide rail 6 is provided with a slider guide groove 16 for guiding the slider 11 and a belt guide groove 18 for guiding a guide belt 17 attached to a side edge of the shade sheet 8. The slider guide groove 16 is defined by an upper guide wall 19 and a lower guide wall 20 and is open toward the inside with respect to the vehicle width direction. The belt guide groove 18 is positioned below the slider guide groove 16, and the lower guide wall 20 also defines an upper part of the belt guide groove 18. The left and right guide belts 17 of the shade sheet 8 are supported by the left and right belt guide grooves 18 to be slidable in the front-rear direction. Thereby, the shade sheet 8 is guided by the guide rails 6 and is maintained taut in the vehicle width direction by a predetermined tensile force.

As shown in FIG. 3, the front end of the guide rail 6 is integrally formed with a stopper 21 for restricting the forward movement of the slider 11. The stopper 21 is formed of a front end part of the upper guide wall 19 that is separated from the rear portion by a notch 22 formed in an inner edge of the upper guide wall 19 with respect to the vehicle width direction and is bent downward so as to protrude into the slider guide groove 16.

As described above, since the stopper 21 for restricting the movement of the shade sheet 8 in the unwinding direction is integrally formed on the guide rail 6, there is no need to attach the stopper member to the guide rail 6 as a separate member, and the number of components can be reduced. Also, the stopper 21 can be easily formed of a part of the upper guide wall 19 separated by the notch 22 formed in the upper guide wall 19 and is bent toward the slider guide groove 16.

Figure 5:
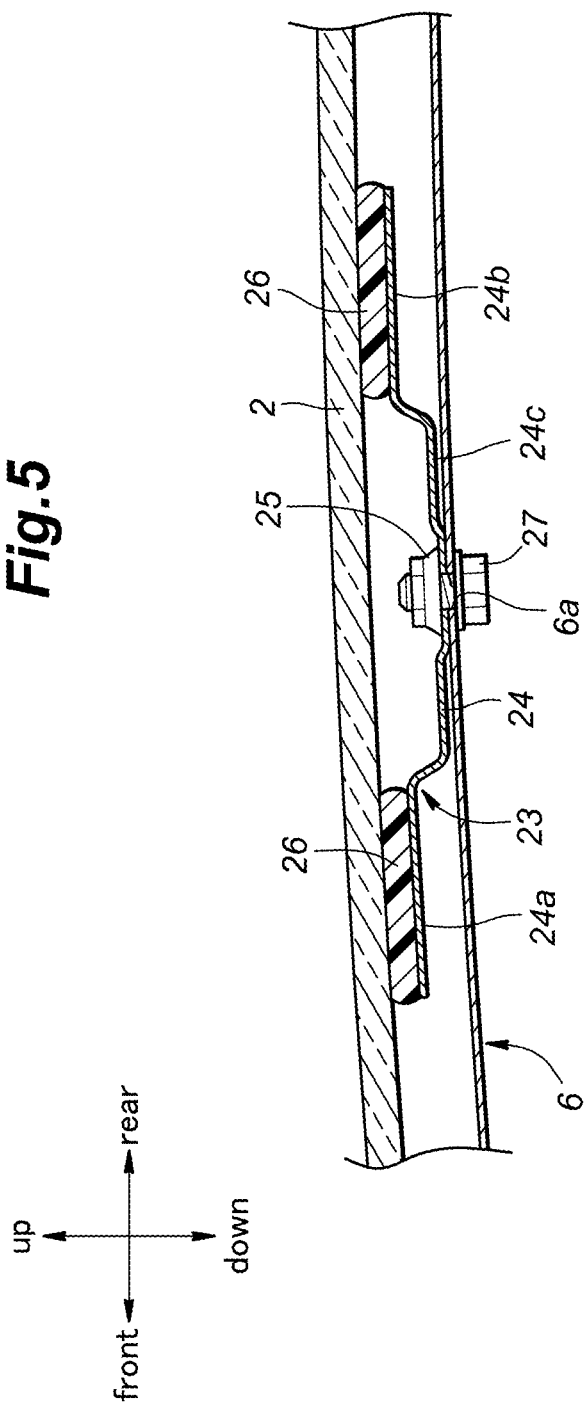
FIG. 5 is a sectional view taken along line V-V in FIG. 1.

FIG. 5 is a sectional view taken along line V-V in FIG. 1. As shown in FIGS. 1 and 5, the guide rail 6 is detachably mounted to multiple rail brackets 23 attached to the inner surface of a side portion of the roof panel 2. In the present embodiment, each rail bracket 23 includes a bracket main body 24 that is a press molded product elongated in the front-rear direction and a weld nut 25 welded to the upper surface of the bracket main body 24. The bracket main body 24 includes a front portion 24a and a rear portion 24b that are joined to the roof panel 2 by an adhesive agent 26 and an intermediate portion 24c disposed below the roof panel 2 via a gap. The weld nut 25 is welded to the upper surface of the intermediate portion 24c.

The guide rail 6 is fastened to each rail bracket 23 with a bolt 27 inserted in a bolt hole 6a formed in the guide rail 6 and threadably engaged with the weld nut 25. The bolt hole 6a is formed to be larger than the shaft portion of the bolt 27. The pair of guide rails 6 is fixed by the bolts 27 in a state in which the guide rails 6 are disposed in predetermined positions to be parallel to each other. Thereby, the shade sheet 8 is maintained taut in the left-right direction.

Figure 6:
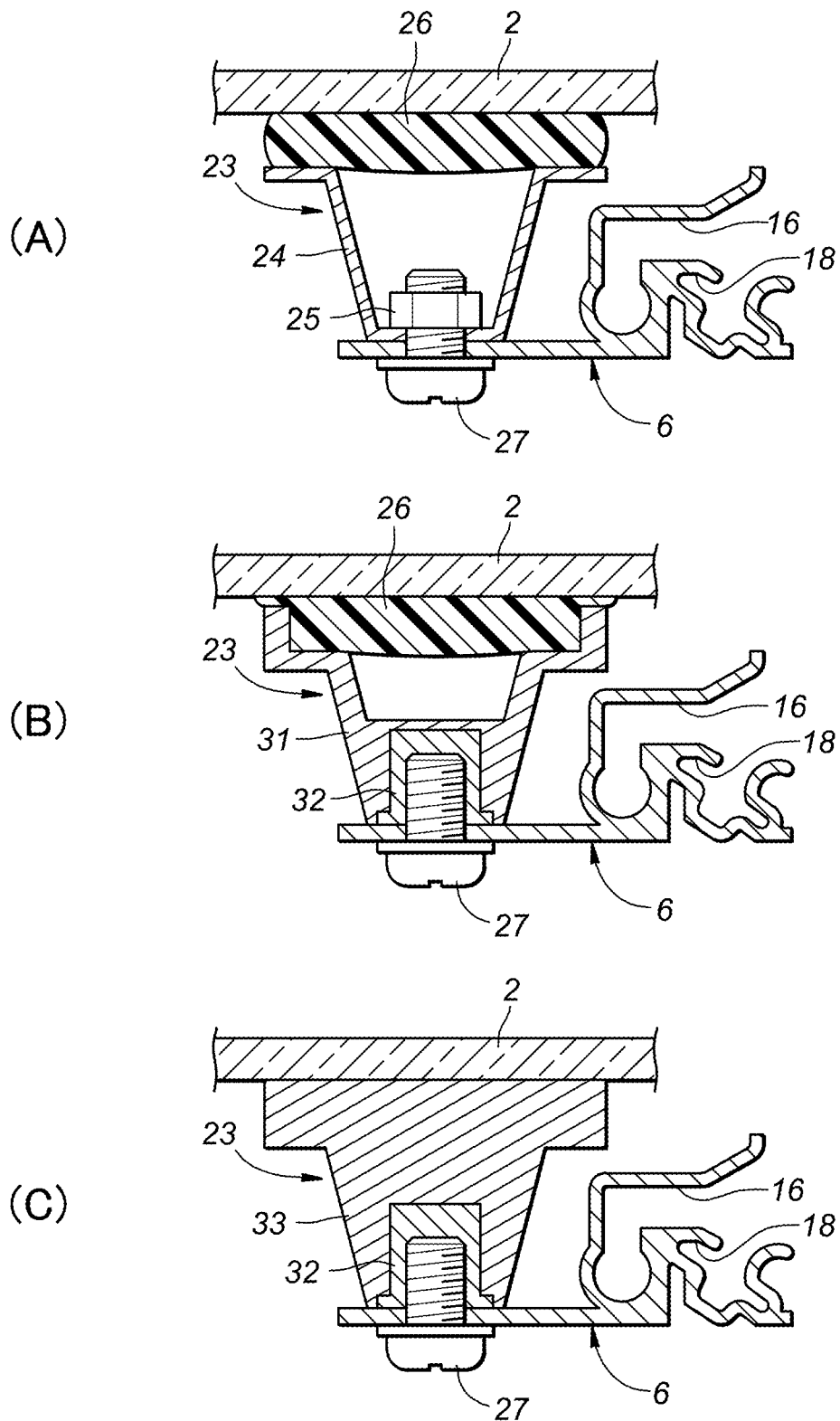
FIG. 6 is sectional views showing modifications of a rail bracket.

The rail bracket 23 is not limited to the structure described above. FIG. 6 is a sectional view showing modifications of the rail bracket 23. FIG. 6(A) shows a form similar to the above embodiment. As shown in FIG. 6(A), in this modification, the bracket main body 24 is composed of a press molded product having an uneven shape in the vehicle width direction. In the example of FIG. 6(B), the rail bracket 23 includes a bracket main body 31 that is an injection molded product of resin and an insert nut 32 integrally provided in the bracket main body 31 so as to be exposed on the lower surface of the bracket main body 31. Similarly to the above embodiment, the bracket main body 31 is joined to the inner surface of the roof panel 2 by the adhesive agent 26. In the example of FIG. 6(C), the rail bracket 23 includes a bracket main body 33 that is a reaction injection molding (RIM) product of polyurethane (PUR) which is a thermosetting resin and an insert nut 32 integrally provided in the bracket main body 33 so as to be exposed on the lower surface of the bracket main body 33. Unlike the above embodiment, the bracket main body 33 is directly joined to the inner surface of the roof panel 2 without using the adhesive agent 26.

The roof module 1 is configured as described above. Next, the effects of the roof module 1 will be described.

As described above, the roof module 1 shown in FIGS. 1 and 2 is provided in the front portion of the roof of the vehicle. The front portion of the roof of the vehicle is generally positioned above the driver's seat. Therefore, below the front end portion of the roof module 1, many functional components, such as interior lights, operation switches therefor, operation switches for the shade device 3, etc., are disposed. In the present embodiment, the winding device 9 and the drive source 12 are arranged in a concentrated manner on the rear end side of the guide rails 6, and no cross member connecting the guide rails 6 is provided on the front end side of the guide rails 6. Therefore, the degree of freedom of layout in the front portion of the roof is improved.

As described above, the roof module 1 is provided with the rear cross member 7 connecting the rear portions of the guide rails 6 to each other. Therefore, before being mounted to the roof panel 2, the pair of guide rails 6 can be treated as the rail assembly 4 in which the guide rails 6 are connected by the rear cross member 7, and thus, the manufacture of the roof module 1 is easy.

As described above, the rear cross member 7 is disposed in front of the winding device 9, and the shade sheet 8 is guided by the rear cross member 7. In other words, the rear cross member 7 functions as a guide member for the shade sheet 8, therefore, there is no need to provide an additional member to guide the shade sheet 8, and the number of components of the roof module 1 is reduced.

The roof module 1 is provided with the pair of guide pipes 15 for guiding the power transmission members 14. The drive source 12 is disposed behind the winding device 9, and the drive source 12 is connected to the guide rails 6 via the guide pipes 15. Therefore, before being mounted to the roof panel 2, the drive source 12 and the rail assembly 4 can be treated as a shade assembly in which the drive source 12 is connected to the rail assembly 4 via the guide pipes 15, and thus, the manufacture of the roof module 1 is easy.

Concrete embodiments have been described in the foregoing, but the present invention can be modified in various ways without being limited to the above embodiments. For example, in the above embodiment, the power transmission members 14 are composed of push-pull cables. In another embodiment, each power transmission member 14 may be composed of a wire stretched in a loop. Besides, the concrete structure, arrangement, number, material or the like of each member or part may be appropriately changed without departing from the spirit of the present invention. Also, not all of the components shown in the foregoing embodiments are necessarily indispensable and they may be selectively adopted as appropriate.

LIST OF REFERENCE NUMERALS

1: roof module
2: roof panel
3: shade device
4: rail assembly
5: roll shade
6: guide rail
7: rear cross member
8: shade sheet
9: winding device
10: cross bar
11: slider
12: drive source
14: power transmission member
15: guide pipe
16: slider guide groove
19: upper guide wall
21: stopper
22: cutout
23: rail bracket

The invention claimed is:

1. A roof module for a vehicle, the roof module comprising:
    a roof panel;
    a pair of guide rails mounted on an inner surface of the roof panel and extending in a front-rear direction of the vehicle;
    a shade sheet guided by the guide rails;
    a winding device supported by the guide rails and configured to wind up the shade sheet;
    a drive source configured to drive the shade sheet in an unwinding direction and a winding direction;
    a rear cross member connecting rear portions of the guide rails to each other; and
    a cross bar provided at a front end of the shade sheet and including a pair of sliders guided by the guide rails,
    wherein the winding device and the drive source are arranged in a concentrated manner on a rear end side of the guide rails, and no cross member connecting the guide rails is provided on a front end side of the guide rails,
    a stopper for restricting a movement of the shade sheet in the unwinding direction is integrally formed on each guide rail,
    the guide rails have guide walls defining slider guide grooves for guiding the sliders, and
    the stopper is formed of a part of each guide wall that is separated from another part by a notch and is bent so as to protrude into the slider guide groove.

2. The roof module for a vehicle according to claim 1, wherein the rear cross member is disposed in front of the winding device, and the shade sheet is guided by the rear cross member.

3. The roof module for a vehicle according to claim 2, further comprising a pair of guide pipes configured to guide power transmission members for transmitting a driving force of the drive source to the shade sheet,
    wherein the drive source is disposed behind the winding device and is connected to the guide rails via the guide pipes.

* * * * *